O. L. INGRAM.
POWER TRANSMISSION MECHANISM.
APPLICATION FILED MAY 21, 1915.
1,165,974.
Patented Dec. 28, 1915.
3 SHEETS—SHEET 1.
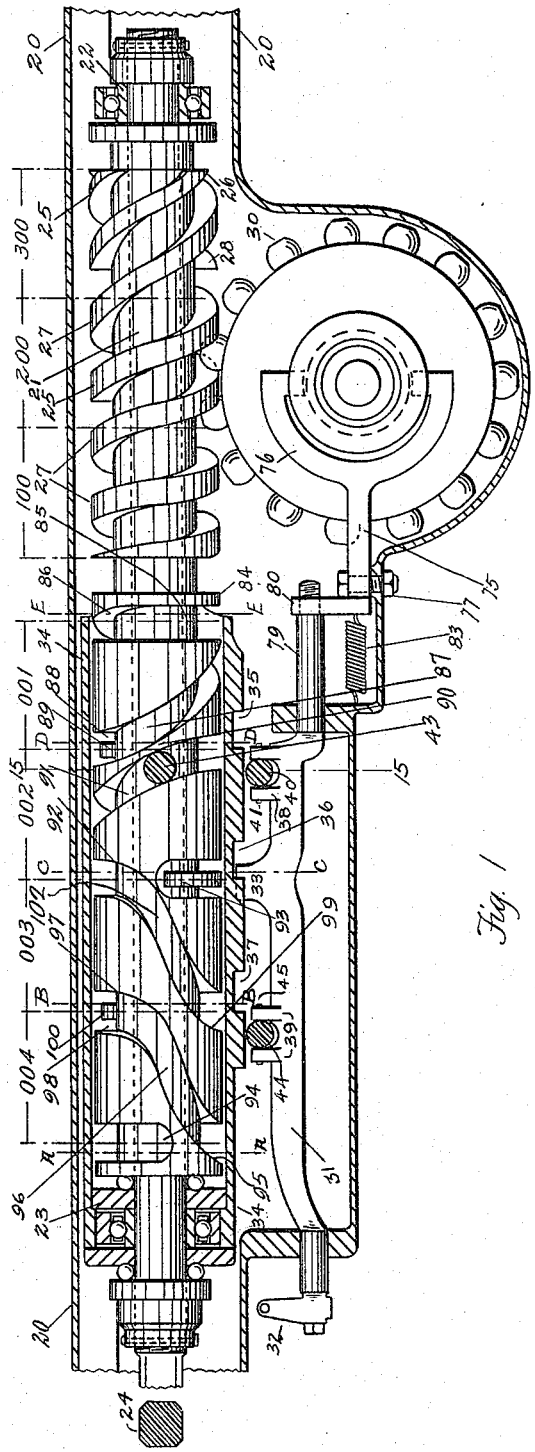
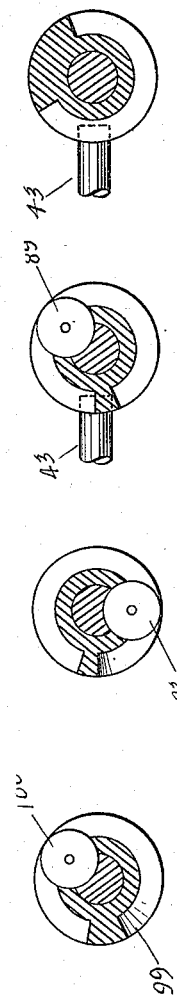
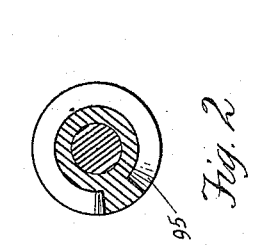

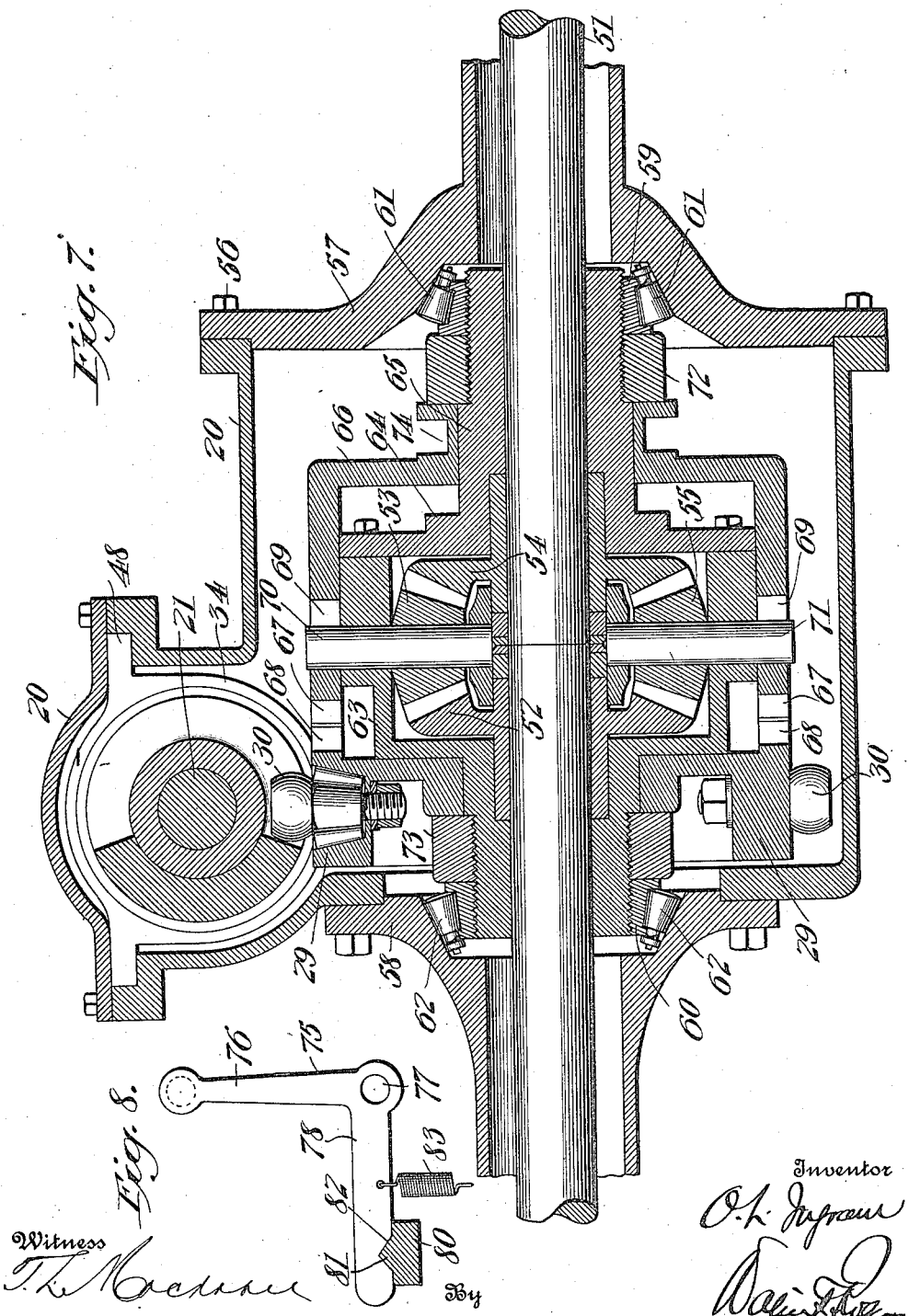

O. L. INGRAM.
POWER TRANSMISSION MECHANISM.
APPLICATION FILED MAY 21, 1915.
1,165,974.
Patented Dec. 28, 1915.
3 SHEETS—SHEET 3.
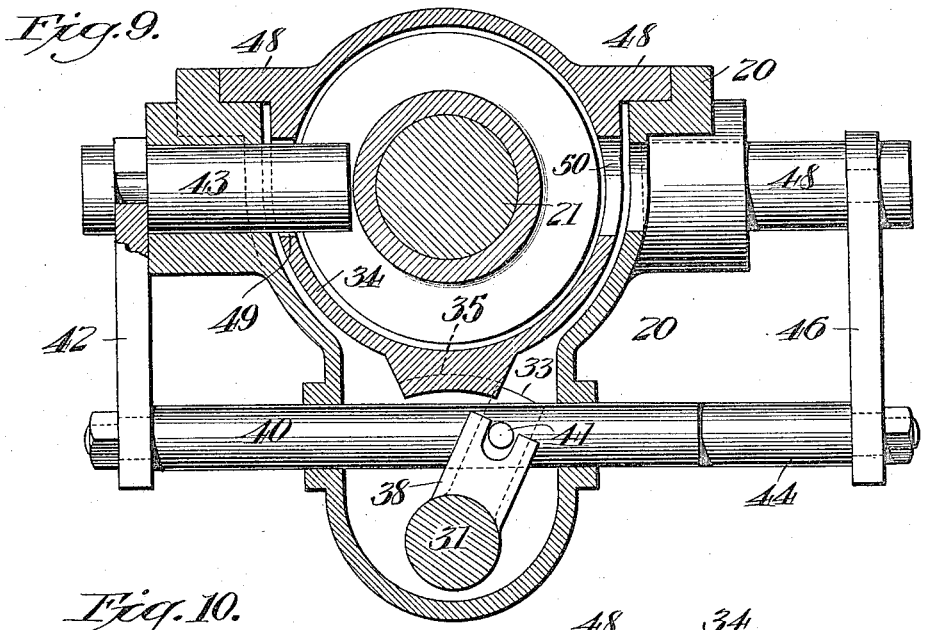
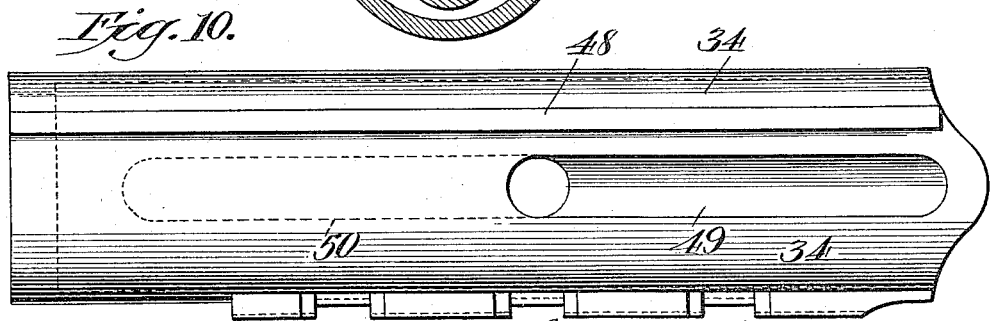
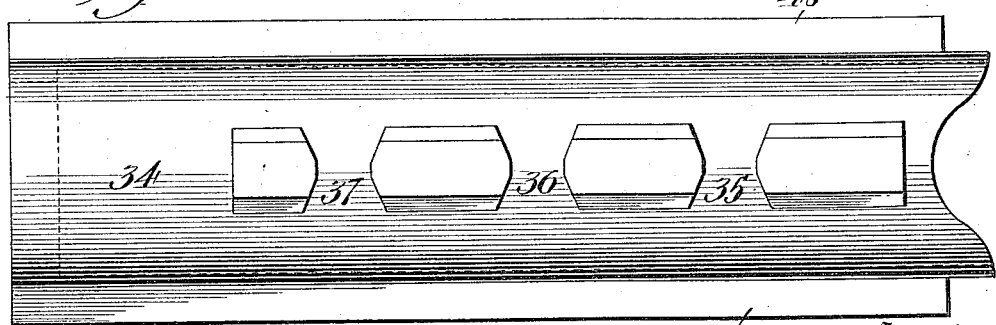
Witness
Inventor
O. L. Ingram
By
Attorney

UNITED STATES PATENT OFFICE.

OSCAR L. INGRAM, OF WALLA WALLA, WASHINGTON.

POWER-TRANSMISSION MECHANISM.

1,165,974.

Specification of Letters Patent.   Patented Dec. 28, 1915.

Application filed May 21, 1915.   Serial No. 29,626.

*To all whom it may concern:*

Be it known that I, OSCAR L. INGRAM, a citizen of the United States, residing at Walla Walla, in the county of Walla Walla and State of Washington, have invented certain new and useful Improvements in Power-Transmission Mechanism; and I do hereby declare the following to be a full, clear, and exact description of the invention, such as will enable others skilled in the art to which it appertains to make and use the same.

My invention relates to power-transmission mechanism, and especially to a change-speed mechanism which is broadly applicable to all forms of machinery in which power is transmitted from a driving member to a driven member, and which is especially effective in motor-driven vehicles. For purposes of illustration, I have, therefore, described my invention as applied to an automobile.

The object of my invention is to produce a simple and practical change-speed mechanism in which the change of speed of the driving member and the driven member, or between the two, is accomplished without the clashing of gears, without noise, and in so far as is practicable, automatically utilizing the power of the driving shaft to shift the shaft for purpose of changing the speed.

A further and very important object of my invention is to produce a mechanism in which the connection between the parts shall be positive and in which the driving member and the driven member shall not be disconnected during the change, thus achieving smoothness and certainty of action, and eliminating noise and wear.

Other objects are to reduce the friction and to simplify the construction.

To accomplish these ends I have provided a mechanism covered by the appended claims.

My invention in the form illustrated, comprises essentially, a driving shaft which carries at one end a series of helical gears of similar pitch, but with varying leads, and at the other end a series of channels or grooves with which engage members from opposite sides so that the rotation of the shaft when in engagement with these members as bearing centers will result in shifting the shaft forward or backward, depending upon which member is in engagement with the channels and the channel or the portion of a channel which is engaged.

The helical threads, which in effect constitute a varying driving worm, are illustrated as providing three speeds,—low speed, intermediate speed and high speed, there being, as illustrated, one thread for the low speed, two threads for the intermediate speed, and four threads for the high speed.

The channels are arranged practically in two separate zones in which the channels are reversely arranged with reference to each other. Each of these zones completes two actions as the engaging member remains stationary while the channel travels about it. It is obvious that a pin, when the shifting effect is being produced, must engage its channel, that when the shifting effect is concluded the pin must be disengaged from the channel, and that in the intermediate state there must still be a control to hold the parts in proper relation to each other during the shifting movement. I secure these effects by a relation between a surrounding sleeve coupled to the shaft and a governing mechanism and by cam rollers in the channels of the zones. In the illustrated form, the sleeve, which is connected to the shaft and shifts with it, has recesses which are engaged by a locking member carried by the governing mechanism which operates the pins. I have shown, lying beneath the sleeve and the driving shaft, a rocker having a projecting upward member which may engage any one of a series of recesses in the bottom of the sleeve to lock the sleeve in an adjusted position longitudinally. The rocker serves to move into the channels the two pins which enter the channels from opposite sides and at different positions longitudinal of the drive shaft. When the pin on one side enters a channel in the forward zone, it serves as a bearing center so that as the helical channel or worm of the forward zone rotates against the pin the resulting effect will be a forward movement or shifting of the driving shaft. It is necessary, of course, that this movement shall be timed or limited, and to this end I have placed in the channels cam-rollers, in such position that the face of a cam-roller will bear against the pin to force it back, and thereby force back the rocker connected with the pin and the locking member on the rocker, so that it will engage the next recess to the rear and hold the parts locked together at that stage and until another operation of the rocker through an appropriate handle or lever. Obviously, the opposite effect will be produced by the action of the other pin entering a channel in the zone at the rear, so that the driving shaft will then be shifted rearward. I have also provided a connection between the rocker controlling mechanism and the driven gear, so that during this operation of shifting there may still be a connection between the helical gears of the driving shaft and the driven gear, but the driven gear is disconnected from its shaft or equivalent member—a point which is vitally essential in a power-transmission of this character when used in machines such as automobiles or motor-boats, etc.

It should be observed that in backing the machine, or reversing, the ordinary form of reverse gear in the ordinary gear-box and connected up in the usual manner, may be used with the customary universal coupling going to the driving shaft. It will be understood, however, that in my mechanism, all of the gears in the gear-box, except the reverse gears, may be eliminated. It is, however, necessary to use a form of clutch having clutch teeth such as is ordinarily used in gear-boxes, in order to connect the crank shaft with the customary universal coupling to transmit the power to the driving shaft and to disconnect the same when it is desired to put the machine in neutral.

In the detailed description it will appear that I have not merely suggested the idea of utilizing the rotation of the driving shaft to shift it, but have so related the controlling zones, the governing mechanism and the driving and driven elements as to produce a practical and operative machine of this sort.

In the accompanying drawings,—Figure 1 is a partial side elevation with certain parts in section; Figs. 2–6 are partial sections and elevations of the channels and cam-rollers. Fig. 7 is a vertical section through the ring-gear and the driven mechanism; Fig. 8 is a detail of the ring-gear clutch operating lever. Fig. 9 is a section on the line 15—15 of Fig. 1; Figs. 10 and 11 are, respectively, a partial side elevation and a partial bottom plan view of the sleeve surrounding the controlling zones.

In Fig. 1, 20 represents a magazine or casing inclosing the operative parts to be described. 21 is a driving shaft reduced at each end and appropriately journaled and having at each end thrust bearings 22 and 23 of a familiar type, which are somewhat specifically illustrated, but do not require further description.

As indicated at 24, the driving shaft 21 is squared at one end to receive a power-imparting connection. The squared end should be of sufficient length to allow it to always remain in a corresponding female member which may comprise one end or member of the customary universal coupling.

Near one end, the driving shaft bears a series of helical threads, 25, 26, 27, 28, forming a worm gear which engages in a ring-gear or gear-wheel 29, carrying on its periphery rounded roller teeth 30 to facilitate the action of the worm threads upon the ring gear.

The driving threads of the shaft, broadly, have a uniform pitch but different leads, or, more specifically, there is a plurality of groups of teeth or threads, each group having a uniform pitch and a uniform lead within itself, the several groups and each helix thereof having a lead differing from the lead of the teeth of the other groups, but having a pitch common to the pitch of all the other groups. In the illustrated form it is shown that two of the four teeth of the high-speed series, i. e. 25, 27, on the driving shaft 21 merge into and become the two teeth that comprise the intermediate or second-speed series, and that one of these continues and merges into and becomes a single tooth comprising the first speed helix, or the low speed zone of the driving gear of the shaft 21. That is to say, there will be two teeth of the high-speed zone which will be partially helices, one tooth which will be practically a double helix and one tooth which will be practically a quadruple helix.

For the low speed a single convolution of the thread 27 is provided, for the intermediate speed a convolution of each of the two threads 25, 27, and for the high speed four convolutions, 25, 26, 27, 28. It will be understood readily that the speed will be in proportion to the number of threads which within a given space engage the ring-gear, and that within the space of a rotation of the shaft 21, one thread will engage the ring gear 29 when at the low-speed position, two threads when at the intermediate-speed position, and four threads when at the high-speed position.

The arrangement of the helices and their continuity is an important feature, because it, in connection with the controlling devices illustrated, makes possible and practicable the changing of speeds without disengaging the driven gear and the driving shaft. As the shaft is shifted from a higher speed to a lower speed, there will always be one or two of these helical teeth in engagement with the ring gear.

At the opposite end of the driving shaft 21 from the driving threads, are two divisions of grooves of a worm formation comprising a series of cam-channels, in which at intervals lie cam rollers. These channels may be cut into the solid steel shaft 21, or into a sleeve on a core and the shaft itself is, preferably, integral therewith, though, of course, any other plan of structure may be employed.

I have illustrated the divisions of the helical driving threads into low speed, intermediate speed and high speed, respectively, by vertical dotted lines indicated by the illustrative designating numerals 100, 200 and 300, applied in the order named.

It is obvious that the controlling zones toward the opposite end must be likewise divided. There are in the two zones illustrated, four controlling divisions because the driving shaft will be shifted from high to intermediate, and from intermediate to low, making these shifts toward the rear, and from low to intermediate, and from intermediate to high, making these shifts forward. I have, therefore, in carrying out this plan of diagram, indicated in Fig. 1 by dotted lines and illustrative numerals the division of the controlling zones broadly by 001, 002, 003, 004.

Before describing in detail the cam channels and the cam rollers, I will describe the controlling mechanism by which these channels and the cam rollers are utilized.

It is apparent that it is necessary to automatically limit the movement or shifting of the shaft 21 so that the change may be precisely from one speed to another. To this end I have provided a controlling mechanism including as its central feature a rocker 31 journaled in the lower part of the casing 20 and operated in any manner. In the form shown it is moved by the operator through a handle or lever, 32, it being understood, of course, that this lever 32 may be connected up by any suitable means, so that it may be operated from any convenient position, and in any convenient manner by foot or hand.

The rocker 31 bears a locking member 33. A sleeve 34, as shown in Fig. 1 and again in Figs. 9, 10 and 11, surrounds the driving shaft and its cams and channels, and moves longitudinally with the driving shaft. In the bottom of the sleeve is a series of recesses, 35, 36, and 37. Premising that the driving shaft is shown as ordinarily placed in an automobile, the recess 35 when it receives the locking member 33 will lock the shaft 21 in the foremost position, the recess 36 will lock it in the intermediate position, and the recess 37 in the position corresponding with the low speed. In the illustration in Fig. 1 the locking member 33 is shown as having just left the recess 36 as the shaft 21 is being moved rearward taking it from the intermediate to the low-speed position. It will be understood also that when this locking member 33 is moved to one side, a position it has just taken in Figs. 1 and 9, the sleeve 34 and the shaft 21 will be free to move longitudinally.

On the rocker 31 and on opposite sides of the locking member 33 are pairs of standards 38 and 39. Between the standards 38 passes a rod 40 secured by a pintle 41, passing through the standards and the rod. The rod 40 carries at its outer end an arm 42 open at the top to receive a pin 43, which enters the walls of the casing 20 and the sleeve 34 and is adapted to engage one of the channels of the controlling zones, ultimately being engaged by a cam-roller lying in the channel which will push out the pin 43 and with it the arm 42 and rod 40, throwing back into normal position the rocker 31, and bringing the locking member 33 into a recess in the sleeve 34, which, in the example illustrated in Fig. 1, would be the foremost one 37. This mechanism just described controls the movement of the driving shaft 21 to the rear, that is, from high speed to intermediate speed and from intermediate speed to low speed. Between the standards 39 and on the opposite end of the rocker lies a rod 44 secured by a pin 45 to the standards 39. The rod 44 carries an arm 46 open at the top to receive a pin 47 which projects through openings in the casing 20 and the sleeve 34 in a position to enter a channel of one of the controlling zones. A movement of the rocker 31 opposite to that previously described will effect the same relative actions which have just been described in connection with the operation of the locking member 33. That is to say, such movement of the rocker will swing the locking member 33 in the opposite direction, bringing the pin 47 into a channel, where it remains until it runs up the face of a cam-roller lying in that channel, whereupon the pin 47, the arm 46 and the rod 44 will be forced out by the action of the cam-roller upon the pin 47, bringing the locking member 33 back into the recess, then lying opposite it.

There are certain incidental features. For example, the pins 43 and 47 are free to rotate so that they more easily bear upon the walls of the channels in the controlling zones. As illustrated in Fig. 9, for example, the sleeve 34 is flanged at 48 to form a support for the sleeve and the connected parts. It is obviously also necessary that the sleeve 34 be slotted as indicated at 49, 50, on opposite sides, and opposite ends, so that it may pass to and fro without interference with the pins 43, 47, which project through the slots to engage the channels of the controlling zones. (Fig. 9).

I have given a certain form to the recesses 35, 36, 37 in the sleeve, but as these are made with reference to the formation of the channels the description of their function will be reserved for a later presentation, it being now observed that end wall of each recess is chamfered to give an inclined passage for the entrance and exit of the locking member. (Fig. 11).

Whatever the connection between the ring-gear 29 and the driven mechanism, it is obvious that it becomes necessary in the operation of any such mechanism as shown to release at certain times the ring-gear from the part it drives, so that it may have a free revolving movement relative thereto.

I will now describe the mechanism which is operated by the ring-gear and the sliding clutch member which provides for the disengagement of these two. I have represented a driven shaft 51 in the form of the rear axle of an automobile. To this shaft are secured for driving it the customary differential gears 52, 53, 54 and 55. All these parts are surrounded by the casing 20, to which is bolted at 56 the head of a sleeve 57 surrounding the axle, while to the other end is bolted a similar sleeve and head 58.

59 and 60 represent the customary inner races used in connection with the familiar Timken roller bearings 61 and 62. The differential gears are inclosed by a casing 63, having an end plate 64. The plate 64 has a projecting hub 65, as shown in Fig. 7, by which some of the parts above described are carried, the hub of the casing 63 forming a bearing for the ring-gear 29. A clutch member 66 is so formed that while its hub encircles the sleeve or hub 65, its body embraces plate 64 and the casing 63 so that it moves back and forth about the differential gears and their casing, its teeth 67 engaging teeth 68 of the ring-gear 29. The barrel of the clutch 66 is slotted at 69 to receive pins 70 and 71, each of which carries a central gear of the differential gear mechanism. The slots 69 permit the clutch 66 to reciprocate so as to bring its teeth into and out of engagement with the teeth of the ring-gear, but any rotation of the ring-gear while in engagement with the clutch 66 will also rotate the differential gear assembly through the pins 70 and 71 and finally, through the differential gear assembly the driven shaft or axle 51.

The clutch 66 moves on the hub 65 which is threaded as shown and carries nuts 72, 73 the clutch having a recessed hub 74 which receives an operating yoke to be described and abuts against the nut 72.

The clutch 66 is shifted through the medium of a lever 75 having a yoke 76 whose inturned ends engage the recess 74 of the clutch. The lever arm 75 is pivoted at 77 and turns at a right angle forming an arm 78. The lever 75 is to be operated each time the rocker 31 is rocked, so that while the ring-gear 29 continues constantly in engagement with the helical driving threads of the shaft 21 it is at each change of speed disengaged from the mechanism it drives, that is, the mechanism which rotates the shaft 51. To this end, the rocker 31 has a reduced continuation 79 taking through an opening in a vertical bar 80. In the illustrated form the bar 80 has a pyramidal projection 81, that is, a projection inclined on two sides which is adapted to fit within a notch 82 in the lever arm 78, the lever arm being constantly drawn to that position by a spring 83. In Fig. 7 the clutch is shown disengaged. To achieve this, when the rock shaft 31 is turned the bar 80 will be pushed over to one side, one of the inclined faces of the projection 81 riding along the inclined face of the notch 82 until it rides upon and pushes out the arm 78 thus moving over the lever arm 75 and the yoke 76 so as to shift the clutch into the position shown in Fig. 7.

The bar 80 may be made adjustable on the end of the extension 79 by simply placing washers between the bar 80 and the shoulder of the extension 79, before setting the nut on the end of the extension. This nut is removed in Fig. 1, showing merely a threaded end of extension 79.

I have heretofore described generally the channels and cam-rollers of the controlling zones which are located at one end of the shaft 21. I have reserved the specific description of these parts because the preceding description enables me to point out the relation of the detailed features of the channels and the cams to the operation of the helical threads through the medium of the pins or engaging members operated by the governing rocker.

The first controlling zone lying between the dotted lines indicated by the numerals 001 and 002 comprises channels whose trend is broadly similar to the trend of the helical driving threads at the other end of the shaft, while in the zone 003, 004 the trend of the channels is opposed to the trend of the helical driving threads.

Each of the controlling zones, in the illustrated form, comprises two helices. That is to say, the channels are so cut, in the preferred form, that if the walls or the separated parts were brought together there would be in effect two bands encircling the shaft 21 in each zone. When the channels are cut so as to apparently separate these bands, then the effect is produced of connected walls with intervening helical channels running, broadly, in one direction in one zone, and in the opposite direction in the other zone.

To one side of the zone nearest the helical threads is a substantially circular wall 84, which encircles the axes of the drive shaft in a plane at right angles thereto and comprises a wall of a channel 85 which encircles the drive shaft in a plane at right angles to the axes thereof. As shown in Fig. 1, the wall 84 at one point merges gradually from a straight line (relative to the axes of the drive shaft) into a curved wall 86, which may be termed the beginning of the wall of the helical channel 87 inasmuch as this curved wall 86 merges into the helical wall of channel 87 as shown in Fig. 1. As will be seen in Fig. 1, the walls of the helical channel 87 then merge by a slow reverse curvature into the walls of another straight channel 88. Revolubly mounted in this channel 88 is a cam-wheel 89, the periphery of which lies flush with the circumferential surface of the walls of the channel 88. Then by the slow curvature of the wall 90 the helical channel 91 merges from the straight channel 88, and again by reverse curvature this helical channel 91 gradually merges into a straight channel 92. It may be said here that this straight channel 92 is common to both zones as the channels of both zones coming from opposite directions merge into it, as seen in Fig. 1. In this straight channel 92 is another cam-wheel 93, revoluble on an axis embedded in the body of the drive shaft in any suitable manner. Inasmuch as the channels in the other zone are similar to those just described in every detail, except that they are arranged in reverse helicals it does not seem necessary to describe them. The purpose of the cam wheels 89, 93 and 100 is to expel the bearing pins 43 and 47, after they have performed their function of guiding and controlling the drive shaft in its longitudinal movements.

As plainly indicated and described, the various helical channels merge into the straight channels by a slow curvature, having no abrupt point of juncture therewith. The drive shaft, its sleeve and the attached parts make up a combination of parts of considerable weight. The longitudinal movement of these parts is accomplished within a fraction of a second, if the machinery is moving rapidly, as it sometimes would when used in a motor driven vehicle, and it will be understood that if this movement were started suddenly, or should terminate suddenly, there would be a resulting jar on all of the connected parts, and a severe blow to the thrust bearings. This tangential merging by a slow curvature insures the easy movement of a pin in camming action against a wall of a cam-channel, so that the shock is absorbed, and the change of speed is made at a high rate of speed without injury to the mechanisms.

Premising now, that the transmission is in high speed, instead of as shown in Fig. 1, the pin 43 when moved by the rocker and connected parts will enter the channel 85. Thereupon the revolving motion of the drive shaft will cause the pin to engage very gradually and without shock, the curved wall 86. This will start the drive shaft to moving longitudinally toward the rear and the pin will move through the channel 87. (It is understood, of course, that this movement of the pin is only relative inasmuch as it is the cam channel that actually moves). From the channel 87 the pin enters channel 88 being controlled in its entrance into 88 by means of the slow curvature of a wall of channel 87 where it merges into a wall of the channel 88. When the pin has entered the channel 88 the second or intermediate speed will be in mesh with the ring gear and the camming function of the pin will have been finished for that particular operation, and it will thereupon be expelled by the cam-roller 89, which expelling movement will also cause the lock to enter the recess 36, locking the mechanism in intermediate speed automatically and timely. As the pin reaches the point in its entrance into the channel 85 where it is engaged by the wall 86 the lock 33 in its outward movement from a recess reaches the chamfered surface of a recess, and the longitudinal movement may begin, although the lock 33 still has some control over the parts as it slides along the chamfered surface, and does not entirely release the sleeve 34 until the pin has fully entered a channel, and the control by the lock merges into the control by a pin, and there is a resulting complete control without a break. A similar but reverse operation takes place from the opposite side when the pin 47 is brought into action in the channel 95, the respective parts 96, 97, 98, 99, 100, operating in the same manner as previously described with reference to the opposite pin.

In the drawings, in Fig. 1 the parts are shown assembled with the pin 43 proceeding along the seconnd stage of operation, having previously brought the helical threads from high speed to intermediate speed.

To recapitulate in different terms. The pin 43 when the machine is in high speed, lies above the channel 85. Through the action of the rocker 31 and connected parts it moves down to engage the wall section 86 lying in the channel 85, and then engages the wall of the channel 87, turning in gradually. The next movement encounters the wall at a more acute angle so that a sharper backward movement is now given to the shaft until the cam-roller 89 contacts with the pin 43 and pushes it out to disengage it and to bring the locking member 31 into locking position so that the parts are locked in the new position, the pin lying then over the channel 88. If the next movement of rocker 31 be in the same direction the pin will take into the channel 88 then bearing against the large angle of the succeeding wall, and finally running up cam wheel 93, which brings the pin out of the channel ready upon the operation of the shaft in the opposite direction to again reach its relative position above the channel 85. In the other zone the pin 47 comes down into the channel 95, passing through channel 96, thence gradually into channel 97, and riding upon the cam-wheel 100, and finally taking position above the channel 99. In the second movement, the pin likewise travels through the channel 102, running up cam wheel 93 until it reaches a position above the channel 92.

There are certain effects of action in changing speed which should be now observed. Inasmuch as the lead of the channel 87 is substantially, though not exactly, the lead of the tooth 25 in the intermediate speed, the driving tendency of the threads 25, 26, 27, and 28 of the worm to drive the ring-gear 29 forward is neutralized by the backward sliding movement of the drive shaft 21, moving as a whole. Therefore the rotation of the ring-gear 29 substantially ceases and the relative action between the thread teeth of the driving shaft 21 or the particular thread which is then in engagement, will be such that the thread thus engaging will remain almost exactly between the same two teeth of the ring-gear 29 during the entire sliding motion of the drive shaft 21, thus resulting in a smooth, noiseless and positive change of speed.

While the operation going from a lower speed to a higher speed is identical with that of going from a higher speed to a lower speed, in so far as the cams, the channels and the pins are concerned, the interaction between the teeth of the ring-gear 29 and the threads on the driving shaft 21 is markedly different in going from a lower to a higher speed. In such change, the channels 97 and 102 do not neutralize the action of the helical worm teeth, but rather accentuate it. That is to say, the rotation of the drive shaft 21 is by means of the teeth 25 and 27 tending to drive the ring-gear 29 forward and by its sliding movement bodily, is acting as a rack to pull the ring-gear forward. Therefore, we have at once a rack action rotating the ring-gear and a worm action revolving it in the same direction. The result causes the teeth of the ring-gear to travel relatively, substantially in what would be, if illustrated, a diagonal path across the helical teeth in a sort of rack-and-pinion-movement.

It will be easily understood that the action of the walls of the channel 97 upon the pin 47 insures the exact relationship between the ring-gear 29 and the driving shaft 21 during this movement necessary to result in a perfect change of speed in the manner above described. This construction of the channels is illustrated, but such features must be governed largely by the relation of the parts in actual use, it being sufficient here to indicate thus the distinction which governs the relation of these channels and the operation of the parts while the principle remains the same in each instance. In the same way, it will be further necessary in actual operation to cut and fit the helical gears so that there may be made a smooth change from low speed to high speed and this will vary, of course, with the form of teeth used, being practically negligible if the teeth be triangular in cross section.

Operation: The operation of the parts has been described as they have been successively discussed, but it will be advantageous to present briefly a general description of the operation.

In the illustration in Fig. 1, the shaft has been shifted from high speed to intermediate speed. Assuming now, continuing the illustration of the use in an automobile, that the driver when about to start the machine, finds it, as customary, with the high speed gears in mesh and desires to put the machine in low speed, which would require shifting the drive shaft 21 longitudinally from its most forward position to its most backward position in order to bring the central part of the helical threads lying in the space 100 substantially over the center of the ring-gear 29. To do this, the engine will, of course, be started in the usual manner with the ordinary toothed clutch in the gear-box in neutral, or, in other words, disconnected. Then the regular service clutch of the car will be pressed out of connection and the toothed clutch in the gear-box will be put in connection so that the machine will be in what is ordinarily termed the direct drive. Then, while the service clutch is held out of commission, the handle 32 is operated in any convenient way to rock the rocker 31 so that it will, through the rod 40, etc., slide the pin 43 inward. Then the service clutch is released as in the usual manner, and the drive shaft 21 will rotate so that the pin 43 which is now in the channel 85, will be engaged by the wall 86 of the channel 85 and the further rotation of the driving shaft 21 will force it to move longitudinally toward the rear of the machine. At the same time, the action of the rocker 31 has so operated the lever 75 through the connected parts as to release the clutch 66 from the ring-gear 29. The same motion of the rocker 31 has caused the locking member 33 to become disengaged from the forward space 35 in which it lay when the machine was in the high gear. As has been previously described, at the conclusion of the movement of the pin 43 along the channel 87, the cam-wheel in channel 88 will engage it and push it out of the channel, and it will then lie over the channel 88 ready for a movement in that zone. This same movement has then automatically brought back the rocker 31 to its normal position so that the recess 36 will be entered by the locking member, locking the parts in normal position.

From the foregoing descriptions it will be seen that the changes from one speed ratio to another are accomplished with certainty and smoothness, which to a great degree is made possible by disengaging the ring-gear from its shaft or equivalent member during the change, and leaving it in engagement with the drive shaft during the change.

I have not considered it necessary to specifically show by illustration the manner in which the ball bearing for the rear end of the drive shaft is supported, inasmuch as it will be readily understood that its outer race should be provided with flanges resembling the flanges 48 on the sleeve 34, in order that it may be supported by the flanges forming a part of the casing 20.

It will be easily seen that the lock 33 during a longitudinal movement of the drive shaft is sliding along the side of the part between the recesses, thus holding the lock out and the camming member in its channel clear through to the end of such movement.

Having thus described my invention what I claim as new and desire to secure by Letters Patent is:—

1. In a power transmission mechanism, the combination of a driving member having a plurality of helical threads, a driven member having a plurality of teeth meshing with the threads, the driving member being shiftable longitudinally, to vary the speed ratio between the members, without discontinuing the meshing.

2. In a power transmission mechanism, the combination of a driving member having a plurality of helical threads, a driven member having a plurality of teeth meshing with the threads, the driving member being shiftable longitudinally, to vary the speed ratio between the members, while one or more teeth mesh with one or more threads.

3. In a power transmission mechanism, the combination of a driving member having a plurality of helical threads, a driven member having a plurality of teeth meshing with the threads, the driving member being shiftable longitudinally in one direction to increase the speed ratio between the members, and in another direction to decrease the speed ratio, and mechanisms operative to maintain a proper meshing between thread and tooth during the longitudinal movements of the driving member.

4. In a power transmission mechanism, the combination of a driving member having a plurality of helical threads, a driven member having a plurality of teeth meshing with the threads, the driving member having a longitudinal movement to increase or decrease the speed ratio between the members, and operatively connected controls, locks and guides co-acting to facilitate such change of speed ratio while one or more teeth mesh with one or more threads.

5. In a power transmission mechanism the combination of a driving member having a plurality of helical threads, a driven member having a plurality of teeth arranged to mesh with the threads, the driving member having a longitudinal movement to vary the speed ratio between the members, a releasable lock holding the driving member normally against longitudinal movement, a manually operated part movable to release the lock, and a power operated part movable to restore the lock to normal position.

6. In a power transmission mechanism the combination of a driving member having a plurality of helical threads, a driven member having a plurality of teeth arranged to mesh with the threads, the driving member having a longitudinal movement to vary the speed ratio between the members, a releasable lock holding the driving member normally against longitudinal movement, a manually operated part movable to control the lock in a releasing movement, and a power operated part movable to restore the lock to normal position.

7. In a power transmission mechanism, the combination of a driving member having a plurality of helical threads, a driven member having a plurality of teeth meshing with the threads, and having axially adjoining parts, the driving member being shiftable longitudinally to vary the speed ratio between the members, a clutch arrangement normally engaging the driven member to hold it against revolving independently, relative to its axially adjoining parts, and a releasing mechanism to release the clutch while the driving member moves longitudinally and in mesh with the driven member.

8. In a power transmission mechanism, the combination of a revoluble driving member having a plurality of helical threads, a driven member having a plurality of teeth arranged to mesh with the threads, a lock normally holding the driving member against longitudinal movement, a clutch arrangement normally holding the driven member against an independent revolving movement, a controlling device movable to release the clutch from the driven member and to release the lock from the driving member, a part, co-acting with the lock and the clutch, movable to cause a revolving movement of the driving member to shift it longitudinally while a tooth and a thread are meshing, to vary the speed ratio between the driving and driven members; and a device moved by such revolving movement, to return the lock to normal position and allow the clutch arrangement to resume its normal position.

9. In a power transmission mechanism, the combination of a revoluble driving member having a plurality of helical threads, a primary driven member having a plurality of teeth meshing with the driving member, a secondary driven member releasably engaged by the first driven member, a lock normally holding the driving member against longitudinal movement, control means for releasing the first driven member from the second and for releasing the lock, and co-acting devices operative to thereupon move the driving member longitudinally and while one or more of the teeth are in mesh with one or more threads, to vary the speed ratio between a driven member and the driving member.

10. In a power transmission mechanism, the combination of a driving member having a plurality of helical threads, a driven member engaged by the driving member and releasably engaging a second driven member, the driving member having a longitudinal movement in one direction to change the speed from a lower to a higher ratio, and in another direction to change the speed from a higher to a lower ratio, a part movable to release the first driven member from the second to enable the driving member to move longitudinally while one or more teeth are meshing with one or more threads, and a bearing piece operative to direct and control the longitudinal movement of the driving member.

11. In a power transmission mechanism the combination of a driving member having a plurality of helical threads, a driven member having a plurality of teeth meshing with the threads, the driving member being shiftable longitudinally to vary the speed ratio between the members, and controlling mechanisms to control the longitudinal movements of the driving member so that in changing from a higher to a lower speed ratio the line of contact between the driving member and the driven member is substantially along the line of a thread of the driving member, and in changing from a lower to a higher ratio the line of contact between the driving member and the driven member is substantially across the threads of the driving member; and suitable guides to maintain a meshing relation between the teeth and threads during the shifting movement.

12. In a power transmission mechanism, the combination of a driving gear having a plurality of helical threads, a driven wheel having a plurality of teeth meshing with the threads; a camming member having a helical camming surface, a bearing member to bear on the camming surface, the members being relatively revoluble and relatively slidable to effect a change of speed ratio between the driving gear and the driven wheel.

13. In a power transmission mechanism, the combination of a drive gear comprising a plurality of helical threads, a driven wheel having a plurality of teeth to mesh with the threads, a camming member operatively connected with the drive gear to revolve therewith to shift the drive member longitudinally to effect a change of speed ratio, and suitable controls to effect a proper connection between the parts, during the camming movement.

14. In a power transmission mechanism, the combination of a driving gear having a plurality of helical threads, a driven wheel having a plurality of teeth meshing with the threads, a camming member having a helical camming wall, a bearing member to bear on the camming wall to shift the driving member longitudinally to effect a change of speed ratio between the members; a camming member having a helical camming wall, a bearing member to bear on the latter camming wall to shift the driving member longitudinally in another direction to effect a different change in the speed ratio without reversing the direction of rotation of the driving member.

15. In a power transmission mechanism the combination of a driving member having a plurality of helical threads, a driven member having a plurality of teeth meshing with the threads, and mechanisms operatively associated with the driving member to shift it in one direction to vary the speed from a higher to a lower ratio, and in the other direction to vary the speed from a lower to a higher ratio without reversing the direction of the rotation of the driving member, and without discontinuing the meshing of the threads with the teeth.

16. In a power transmission mechanism the combination of a driving member having a plurality of helical threads, a driven member operatively engaged by the driving member, a second driven member operatively but releasably engaged by the first driven member, a lock normally holding the driving member against longitudinal movement, a clutch arrangement normally holding the first driven member in engagement with the second driven member, a controlling mechanism operable to release the lock and release the second driven member from the first driven member, and mechanism whereby the revolving movement of the driving member will thereupon shift the driving member longitudinally to effect a change in the speed ratio, and a mechanism whereby a still further revolving movement of the driving member will restore the lock to its locking position, and allow the first driven member to reëngage the second driven member.

17. In a power transmission mechanism a combination of a driving member comprising a plurality of helical threads, and a driven member having a plurality of teeth comprising revoluble pins mounted on its periphery, some of which are always in engagement with some of the threads, the driving member having a longitudinal movement to vary the speed ratio between the members.

18. In a power transmission mechanism the combination with a power transmitting shaft of a group of helical threads carried by the shaft, a group of cam-channels carried by the shaft, and means operating with the cam-channels to longitudinally shift the shaft to effect a change of speed ratio.

19. In a power transmission mechanism, the combination with a power-transmitting shaft of groups of helical threads operatively connected with the shaft to impart variable speed, a group of helical cam-channels operatively connected with the shaft, a member adapted to engage a cam-channel and cause the shaft to shift in one direction, and a member adapted to engage another channel and cause the shaft to shift in another direction.

20. In a power-transmission mechanism the combination with a power transmitting shaft of a group of helical threads at one end of the shaft having varying leads, and a group of cam-channels operatively associated with the shaft, and members engaging the cam-channel from different positions, and a part movable for shifting the members.

21. In a power transmission mechanism the combination with a power-transmitting shaft of a group of helical threads carried by the shaft having varying leads, a group of cam-channels operatively associated with the shaft, members engaging the cam-channels from different positions, and a rocker for shifting the members into engagement with the channel.

22. In a power-transmission mechanism, the combination with a revoluble power-transmitting shaft having varying helical threads, a driving gear engaged by the threads, a set of cam channels operatively associated with the shaft, and means for entering the cam-channels to form a bearing center whereby the rotation of the shaft will cause it to shift longitudinally.

23. In a power-transmitting mechanism, the combination with a shaft carrying a series of helical threads designed to impart variable speed, of means for engaging the shaft to cause the rotation of the shaft to shift it longitudinally.

24. In a power-transmission mechanism, the combination with a shaft having helical threads designed to impart variable speed, of a series of camming-surfaces operatively associated with the shaft, and means for engaging a cam-surface to shift the shaft longitudinally by its revolving motion.

25. In a power-transmission mechanism, the combination with a revoluble shaft having a series of helical threads of substantially the same pitch but with different leads, cam-walls operatively associated with the shaft, and means for selectively engaging different walls to cause the revolving of the shaft to shift it in different directions.

26. In a power-transmission mechanism, the combination of a power-transmitting member having helical threads, cam-walls associated therewith, a rocker, members moved by the rocker to engage the walls, and a lock carried by the rocker normally holding the shaft in normal position longitudinally.

27. In a power-transmission mechanism, the combination with a power-transmitting member having helical threads and controlling walls associated therewith, members operable to engage the walls, a rocker movable to actuate a member to cause it to engage a wall and cam-wheels for engaging the members to automatically return the member and the rocker to normal position.

28. In a power-transmission mechanism, the combination with a driving member having a plurality of helical threads and a series of cam-walls associated therewith of a sleeve surrounding the driving member, movable with the driving member, and having recesses therein, bearing pins, a rocker operable to move a pin to engage a cam-wall, and a locking member movable to engage a recess.

29. In a power-transmission mechanism, the combination with a driving member having helical threads, of a plurality of controlling members having cam-walls formed therein, and means for engaging the cam-walls selectively to shift the shaft back and forth with reference to varying speed ratios.

30. In a power-transmission mechanism, the combination of a driving member having helical threads, a plurality of controlling members having cam-walls formed therein, bearing members to engage the cam-walls to longitudinally shift the shaft back and forth to vary the speed ratio.

31. In a power-transmission mechanism the combination with a driving member having helical threads, of cam-walls some of which are reversely arranged relative to others, and a plurality of bearing members engaging the cam-walls selectively to shift the driving member backward or forward, to change the speed ratio.

32. In a power-transmission mechanism, the combination with a driving member having helical threads, of cam-walls operatively associated therewith, means engaged by the cam-walls to shift the driving member longitudinally.

33. In a power-transmission mechanism, the combination with a driving member having helical threads arranged to drive with varying speed ratios, of a series of channels, a recessed sleeve surrounding the channels, a rocker carrying a locking member for engaging the recesses selectively, and means for disengaging the lock from the sleeve to allow the driving member to shift longitudinally.

34. In a power-transmission mechanism, the combination with a drive member carrying helical driving threads, of cam-channels operatively associated therewith, bearing members for engaging the channels, a rocker to actuate the pins to engage the channels, and curved walls in the channels so that a bearing member will engage a channel without a shock, to move the drive member longitudinally to vary the speed ratio.

35. In a power-transmission mechanism, the combination with a driving shaft having a plurality of worm threads arranged to drive with a varying speed ratio, a driven gear engaged by the threads, a shaft driven by the gear, means for disengaging the gear from its driven shaft during a change of speed ratio, without disengaging the driving shaft from the driven gear.

36. In a transmission mechanism, the combination of a driving member carrying helical driving threads, a driven gear, and means for shifting the driving member without disengaging the threads from the driven member during the shifting.

37. In a power-transmission mechanism, the combination with a shiftable driving shaft carrying a plurality of worm drive threads arranged to impart variable speeds to a driven member engaged by the driving threads, some of the threads being continuous so that when the shaft is shifted there is a continuous engagement between the threads and the gear.

38. In a power-transmission mechanism, the combination with a driving shaft, of a plurality of groups of helical threads some of the threads forming a part of only one group and some of the threads being continuous and forming a part of two or more groups, a driven member engaged by the threads, and means for shifting the driving shaft while the threads remain in engagement with the driven member.

39. In a power-transmission mechanism, the combination with a driving member comprising a plurality of groups of helical threads, some of the threads forming a thread of only one group and some of the threads forming substantially a thread of more than one group, a driven member having teeth engaged by the threads, and means for shifting the driving member to selectively engage the groups of threads with the teeth of the driven member without disengaging the threads from the teeth during the shifting movement.

40. In a power-transmission mechanism, the combination with a driven gear, of groups of helical threads, each group having a lead common to the helices of that group but differing from the lead of the helices of the other groups, all of the groups having substantially the same pitch, and means for shifting the groups to selectively engage the driven member without disengaging the driven member from a meshing relation with the groups.

41. In a power-transmission mechanism, the combination of a driving member comprising groups of helical threads, all of the threads having the same pitch, and the threads of each group having a lead differing from the lead of the adjoining group, and a driven member in constant engagement with some of the threads of some of the groups.

42. In a power-transmission mechanism, the combination with a driving member carrying a plurality of helical threads, of straight channels and helical channels associated with each other and with the driving member, bearing members for entering the channels to govern a change-speed movement of the shaft, the straight channels merging gradually into the helical channels to prevent a sudden engagement of the channels by the bearing members.

43. In a power-transmission mechanism, the combination with a shiftable driving member carrying worm gear mechanisms, of channels associated therewith, bearing members for engaging the channels to govern the shifting of the driving member, means operative by manual effort for bringing the bearing members into engagement with the channels, and means for automatically disengaging the bearing members from the channels at the end of a desired shifting movement.

44. In a power-transmission mechanism, the combination with a driving member, of groups of helical threads, groups of cam-channels associated with the threads, a bearing member adapted to engage a cam-channel to shift the driving member in one direction, a bearing member adapted to engage a cam-channel to shift the driving member in another direction, and means for preventing a bearing member from entering or leaving a channel during a shifting movement.

45. In a power-transmission mechanism the combination with a longitudinally shiftable driving member carrying worm gear mechanisms, of channels associated therewith, bearing members for engaging the channels to govern the shifting movement of the driving member, means operative for bringing the bearing members into engagement with the channels, and means for automatically disengaging the bearing members from the channels at the end of a desired shifting movement.

OSCAR L. INGRAM.

Witnesses:
JOHN L. SHARPSTEIN,
EDWARD C. MILLS.

Copies of this patent may be obtained for five cents each, by addressing the "Commissioner of Patents, Washington, D. C."